United States Patent [19]

Carr

[11] Patent Number: 5,716,083
[45] Date of Patent: Feb. 10, 1998

[54] JOINT ASSEMBLY AND BACKING MECHANISM THEREFOR

[75] Inventor: Ronald L. Carr, Rainier, Oreg.

[73] Assignee: KC Multi-Ring Products, Inc., Kelso, Wash.

[21] Appl. No.: 344,881

[22] Filed: Nov. 25, 1994

[51] Int. Cl.$^6$ ............................................. F16L 17/00
[52] U.S. Cl. .......................................... 285/368; 285/906
[58] Field of Search ............................ 285/368, 412, 285/413, 906

[56] References Cited

U.S. PATENT DOCUMENTS

| | | |
|---|---|---|
| 925,770 | 6/1909 | Herrick . |
| 986,506 | 3/1911 | Sargent ........................ 285/412 X |
| 2,146,218 | 2/1939 | Kimmich et al. .............. 285/368 X |
| 2,532,891 | 12/1950 | Chupp . |
| 2,616,946 | 11/1952 | Scheer ........................... 285/368 X |
| 2,871,035 | 1/1959 | Kaiser . |
| 2,919,936 | 1/1960 | Hurley ........................... 285/368 X |
| 3,141,686 | 7/1964 | Smith et al. . |
| 3,302,953 | 2/1967 | Glasgow . |
| 3,387,867 | 6/1968 | Rogers . |
| 3,398,978 | 8/1968 | Gasche .......................... 285/368 X |
| 3,524,662 | 8/1970 | Tolman et al. ................. 285/368 |
| 4,269,417 | 5/1981 | Dutton . |
| 4,388,259 | 6/1983 | Jewell et al. . |
| 4,484,771 | 11/1984 | Schulz ........................... 285/368 X |
| 4,516,784 | 5/1985 | Merz . |
| 4,756,561 | 7/1988 | Kawata et al. . |
| 4,767,138 | 8/1988 | Schafbuch ..................... 285/368 |
| 4,778,189 | 10/1988 | Udagawa . |

FOREIGN PATENT DOCUMENTS

| | | | |
|---|---|---|---|
| 1125110 | 4/1955 | France . | |
| 1445449 | 5/1966 | France ........................... | 285/368 |
| 509002 | 10/1930 | Germany ........................ | 285/368 |
| 2619893 | 11/1977 | Germany ........................ | 285/368 |
| 2807444 | 8/1979 | Germany ........................ | 285/412 |
| 2909923 | 9/1980 | Germany ........................ | 285/368 |
| 13259 | 1/1983 | Japan ............................. | 285/412 |
| 547375 | 8/1942 | United Kingdom . | |
| 584896 | 1/1947 | United Kingdom ............ | 285/368 |
| 1061419 | 3/1967 | United Kingdom . | |
| 1148556 | 4/1969 | United Kingdom ............ | 285/368 |

*Primary Examiner*—Dave W. Arola
*Attorney, Agent, or Firm*—William A. Birdwell & Associates

[57] ABSTRACT

A joint assembly for a pipe and a backing mechanism therefor. The joint assembly provides for sealing a pipe, the pipe having an elongate axis, an inside surface, an outside surface and a flange disposed at one end thereof, the flange having a front surface facing away from the pipe, a back surface and an inner periphery defining an outlet of the pipe. Sealing material is disposed adjacent the front surface and inner periphery of the flange. A backing member is adapted to engage the flange and to apply a compressive load from the back surface of the flange toward the sealing material adjacent the from surface and the inner periphery of the flange so as to seat the sealing material along the inner periphery. Seating is against a surface of a cooperating joint member adjacent the front surface of said flange.

25 Claims, 6 Drawing Sheets

JOINT ASSEMBLY AND BACKING MECHANISM THEREFOR

BACKGROUND

This invention relates to joint assemblies and backing mechanisms therefor, particularly to joint assemblies employing backing mechanisms in joints formed by a gasket disposed adjacent a flange of a pipe section, the backing mechanism providing for maintaining a seal along the inner periphery of the flange.

In pulp and paper mills, chemical plants, integrated circuit fabrication installations and other industrial facilities, pipe systems generally are employed to convey fluids and fluid-like mixtures. These pipe systems typically include joint assemblies that use pipe sections having flanges disposed at the ends thereof, thereby providing for assembling the sections at joints. The joint assemblies also typically use gaskets or other sealing materials adjacent the flanges so as to form seals in the joints, the seals containing the fluids or fluid-like mixtures within the pipe system.

As is commonly understood in the art, a seal is formed by properly seating the gasket in the joint. Seating of the gasket is generally effected by applying a load to the joint so as to compress the gasket against the flange sufficiently to withstand the pressure of the conveyed fluid or fluid-like mixture. In some conventional joint assemblies, a gasket is seated using a backing ring dimensioned to fit about a flange. The backing ring is drawn against the flange so as, in turn, to draw the flange against the gasket. To do so, conventional backing rings generally employ bolts inserted through apertures in the ring, the apertures being disposed at locations displaced laterally from the inside periphery of the joint. Thence, by tightening the bolts, a laterally-displaced load is applied to the backing ring and a compressive load is applied by the backing ring to the joint.

Figure 1:
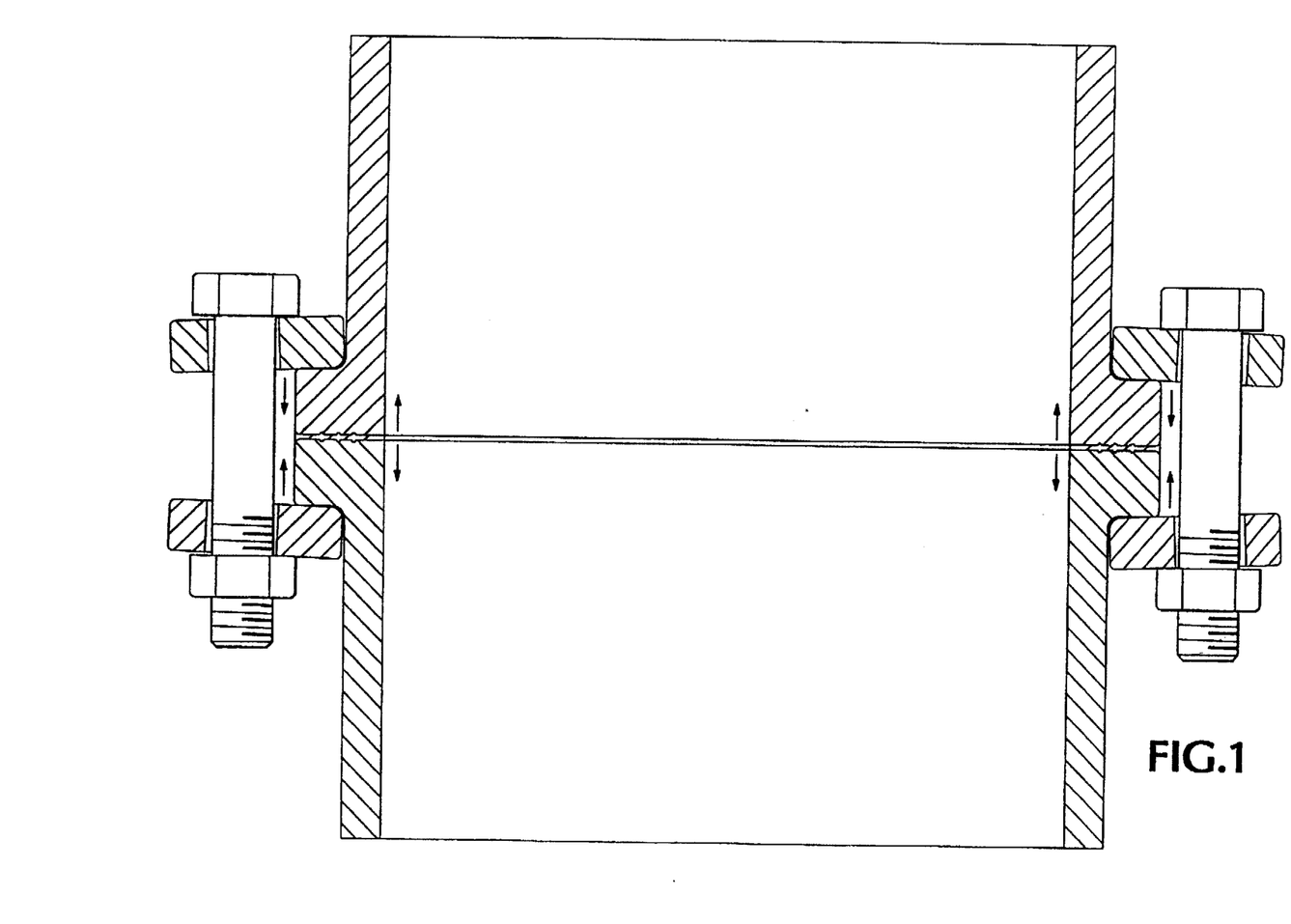
FIG. 1 is a cross-sectional view of a conventional joint assembly employing a standard backing ring.

These conventional joint assemblies, however, are subject to significant problems, particularly as to proper seating of the gasket along the joint's inside periphery. Proper seating can be impeded in such assemblies whenever the effective load along the inside periphery of the joint is diminished relative to the load applied to the joint by the backing ring. A diminished effective load can be attributed to load losses associated with deformation of the flange remote from the joint's inside periphery, as well as to reactive loads applied adjacent that periphery but in direction opposite to the compressive load, each illustrated by arrows in FIG. 1. Load losses and reactive loads, in turn, can be attributed to the laterally-displaced load applied to the backing ring. In particular, once the backing ring is drawn in contact with the flange, the laterally-displaced load causes the backing ring to pivot against the outside edge of the flange, so as to engage the flange and apply the load only along that outside edge. As a result, the flange deforms adjacent that outside edge, generally consuming some portion of the applied load. An additional result is the production of a bending moment along the flange, whereby the load applied along the outside edge produces a reactive load directed away from the gasket adjacent the inside periphery of the joint. Indeed, under high loading, the flange may bow sufficiently to pull away from the gasket adjacent the joint's inside periphery.

When the effective loading is inadequate to seat the gasket properly, the fluids and fluid-like materials conveyed through the pipe system may pass into the joint between the flange and the gasket. In that event, those materials can leak from the joint into the environment. Any such leakage is highly undesirable both as being broadly antithetical to proper performance of a joint assembly, and also as a potential violation of laws regulating environmental releases, particularly where the leaked materials are deemed hazardous.

In addition to leakage, another problem associated with inadequate loading can be the trapping in the joint of the fluids and fluid-like mixtures that pass into the joint. Trapped materials, for example, may accelerate the degradation of the joint, causing premature failure. Trapped materials may also frustrate manufacturing efforts. For example, in the fabrication of integrated circuits, high cleanliness and purity standards must be maintained in order to maintain satisfactory production yields. Nevertheless, relatively contaminated materials generally are used during preparation pressure testing of the pipe system; in particular, test water is used to test the integrity of pipe systems at pressures elevated relative to operating pressures. Once the pipe system is put in operation, an anomalous disturbance in the pipe system, e.g., a pressure transient such as water hammer, can cause test water trapped in the system's joints to be released, such release having the potential to substantially depress yields.

Conventional joint assemblies have not heretofore fully recognized or adequately overcome the above problems. Rogers U.S. Pat. No. 3,387,867, for example, proposes a joint assembly that employs a backing ring having an annular bead, together with a gasket having an annular seal-portion of substantially circular cross-section, the bead and seal-portion forming a line interposed between the common outside diameter of the pipe sections and the outside periphery of a flange. Rogers proposes that a compressive load can be applied through the bead along the above-described line when the backing ring is tightened, so as to compress the seal-portion against a flange while the bending moment exerted on the flange is reduced or eliminated. However, even if that object is accomplished, Rogers is limited to joints having seals displaced laterally from the inner periphery of the respective flange. That is, Rogers fails to address or overcome the problem of directing and maintaining compressive loading adequate to seat properly a gasket or other sealing material along the inner periphery of the flange.

Accordingly, there is a need for an improved joint assembly that fully addresses and adequately overcomes the above problems of conventional joint assemblies which employ a backing ring and gasket. There is also a need for an improved backing mechanism for use in such joint assemblies.

SUMMARY

The present invention fulfills the aforementioned need for an improved joint assembly overcomes the shortcomings of conventional joint assemblies and has advantages not heretofore available in such joint assemblies, by providing a joint assembly employing a backing mechanism in joints formed by a gasket disposed adjacent a flange of a pipe section, the backing mechanism providing for maintaining a seal along the inner periphery of the flange. The present invention also fulfills the need for an improved backing mechanism for use in such joint assemblies by providing a backing mechanism that can so maintain a seal adjacent along the inner periphery of a flange in a joint assembly.

In the joint assembly, a flange is disposed at the end of a pipe section, sealing material is disposed adjacent a joint surface of the flange, and a backing mechanism engages the flange, the backing mechanism receiving a compressive load and directing that load so as to maintain the seating of the sealing material adjacent and along the inside periphery of a joint portion formed by the flange and the sealing material.

The inside periphery of the joint portion is disposed substantially adjacent and along the inner periphery of the joint surface of the flange, which in turn is disposed laterally from the outside surface of the pipe section towards the central axis of the joint. In one preferred embodiment, the backing mechanism comprises a backing member that receives the compressive load and a directing mechanism engaging the backing ring so as to selectively direct the compressive load toward the inside periphery of the joint portion. The directing mechanism can have various embodiments, including: (i) a rounded surface, the rounded surface having selected curvature or curvatures, and being provided in one case by a collar having a rounded cross-section, the collar disposed between the backing member and a load surface of the flange; and, in another case, by the load surface of the flange, for instance, by a beaded portion thereon; (ii) a beveled washer, such as a spring washer, the washer being disposed between the backing member and the load surface of the flange; (iii) a canted surface, the canted surface being disposed at a selected angle relative to the central axis of the joint assembly, and being provided, in one case, by a collar having a substantially triangular cross-section and which is disposed between the backing member and the load surface of the flange and, in another case, by the load surface of the flange; or (iv) a combination of the above. The backing member preferably has a substantially planar surface, a rounded surface or a rounded bead by which the backing member engages the directing mechanism.

In a preferred embodiment, the backing mechanism comprises a backing member having a top face, a bottom face, an inside face and an outside face, the backing member receiving a compressive load along the top face and directing the compressive load to the joint from the bottom face, the bottom and inside faces meeting in a radiused portion adjacent the load surface of the flange and the outside surface of the pipe section, and the bottom face having a beveled portion extending from the radius portion toward the outside face of the backing member, the beveled portion having a predetermined bevel angle. In this embodiment, the beveled portion is drawn to within a predetermined clearance of the load surface of the flange by application to the backing member of a compressive load having a predetermined value, thereby optimizing the application of the compressive load to the joint by minimizing or eliminating deformation of the flange and reactive loading of the joint.

Accordingly, it is a principle object of the present invention to provide a novel and improved joint assembly.

It is another principle object of the present invention to provide a novel and improved backing mechanism.

It is a further object of the present invention to provide a backing mechanism for use in a joint assembly employing a gasket, wherein the backing mechanism provides for maintaining a seal disposed laterally from the outside surface of a pipe section toward the central axis of the joint.

It is yet another object of the present invention to provide a backing mechanism that receives compressive loading and selectively directs that loading toward the inside periphery of a joint, across a broad loading range.

It is yet a further object of the present invention to provide a backing mechanism that maintains a compressive load adjacent and along the inside periphery of a joint by substantially precluding application of reactive loads adjacent and opposite to the loading along that periphery.

It is yet another object of the present invention to provide a joint assembly that optimizes the application of compressive loading adjacent and along the inside periphery of the joint, the periphery being substantially adjacent the inside surface of a pipe.

The foregoing and other objects, features and advantages of the invention will be more readily understood upon consideration of the following detailed description of the invention, taken in conjunction with the accompanying drawings.

DETAILED DESCRIPTION

Referring to FIGS. 2–6, various embodiments of a joint assembly 10 according to the present invention include a first pipe section 12, a second pipe section 14, sealing material 16, backing mechanisms 18 and fasteners 20. The joint assembly 10 also has a central axis 21. Generally, the joint assembly 10 forms a joint 23 by connecting the first pipe section 12 and the second pipe section 14, with the sealing material 16 disposed therebetween, and applying a compressive load, designated by the legend $L_R$ in FIG. 2, to the joint 23 using the backing mechanisms 18 and the fasteners 20 so as to seat the sealing material 16 in the joint 23.

The first and second pipe sections 12 and 14 have respective side surfaces 22 and 28 and outside surfaces 26 and 24. The inside and outside surfaces 22, 24, 26 and 28 typically are annular, in which case they are characterized by respective inside diameters 30 and 32 and outside diameters 34 and 36. It is to be recognized, however, that the surfaces of the pipe sections 12 and 14 may be other than annular and, even if annular, may have inside diameters 30 and 32 that are not equal and outside diameters 34 and 36 that are not equal, all without departing from the principles of the invention. In any case, the inside surfaces 24 and 26 of the pipe sections 12 and 14 define passageways 38 and 40 in those sections for conveying fluid and fluid-like mixtures therethrough.

The first and second pipe sections 12 and 14 have respective flanges 42 and 44 disposed at the adjacent ends thereof, the flanges 42 and 44 extending radially from the central axis 21 of the joint assembly 10. Each flange 42 and 44 preferably defines respective outlets 39A and 39B of the respective pipe sections 12 and 14. Each flange 42 and 44 preferably is integral with and extends continuously and fully around of the respective pipe section 12 and 14. However, it is to be recognized that either flange 42 or 44, or both, may be other than integral and may not so extend, without departing from the principles of the invention.

Each flange 42 and 44 has a joint surface 46 and a load surface 48. Each joint surface 46 has an inner periphery 50 disposed laterally from the outside surface 26 or 28 of the respective pipe section 12 or 14 toward the central axis 21 of the joint assembly 10. Each load surface 48 of the flanges 42 and 44 generally is substantially perpendicular to the central axis 21 of the joint assembly 10. However, as described hereinafter, the load surface 48 may be canted at a selected angle relative to the central axis 21 of the joint assembly 10. Moreover, the load surface 48 may have selected curvature or curvatures, including being convex or concave.

In the joint assembly 10, the sealing material 16 is disposed adjacent the joint surface 46 of the flanges 42 and 44. The sealing material 16, typically a gasket, may be any of a variety of materials, and may take a variety of forms, without departing from the principles of the invention. Preferably, the sealing material 16 has an inner periphery 52 that is dimensioned to coincide substantially with the inner periphery 50 of the joint surface 46 of the flanges 42 and 44. Where the pipe sections 12 and 14 and the flanges 42 and 44 are annular, the sealing material 52 preferably also is annular. It is to be recognized, however, that the sealing material may have other shapes and may have other dimensions, without departing from the principles of the invention, provided the shape of the sealing material 16 is appropriate to sealing the joint 23 of the joint assembly 10.

The fasteners 20 preferably comprise a plurality of bolts 54 spaced about the joint assembly 10 at substantially regular intervals. As shown in FIGS. 2–6, the bolts 54 are coupled to the backing mechanisms 18 by insertion in apertures 56 disposed in the mechanisms 18. It is to be recognized, however, that the fasteners 20 may be other than bolts 54 and may be coupled to the backing mechanisms 18 other than through use of apertures 56 without departing from the principles of the invention. The important point is that the fasteners 20 are associated with the backing mechanisms 18 so as to apply the compressive load to such mechanism 18.

Each backing mechanism 18 comprises a backing member 58 and directing mechanism 60. The backing member 58 receives the compressive load from the fasteners 20. The directing mechanism 60 engages the backing member 58 so as to direct the compressive load to the joint 23 and, thereby, seat the sealing material 16 in the joint. Preferably, the directing mechanism 60 selectively directs the compressive load toward the inner periphery 50 of the joint surface 46 of a flange 42 or 44 so as to seat the sealing material 16 in the joint 23, including adjacent the inside periphery 62 of the joint 23, the inside periphery 62 being disposed adjacent and along the inner periphery 50 of the joint surface 46 of a flange 42 or 44. Depending on the compressive load applied to the backing mechanisms 18, the inside periphery 62 may obtain various dispositions, for example, the variations may range from coincidence with the inner periphery 50 outwardly to coincidence with a line formed parallel to the central axis 21 and passing through a flange 42 or 44 at the point at which the directing mechanism 60 applies the compressive load. It is to be recognized, however, that notwithstanding the direction of the compressive load as selected by the directing mechanism 60, the sealing material 16 preferably seals the joint 23 so that the fluids or fluid-like mixtures conveyed through the passageways 38 and 40 do not pass into the joint 23.

In operation, the fasteners 20 engage the backing member 58 so as to apply a compressive load thereto and, thereby, draw the backing ring 58 against the associated directing mechanism 60 in a direction substantially parallel to the central axis 21 of the joint assembly 10. The directing mechanism 60 directs that compressive load to the joint 23 so as to compress the sealing material 16 against one or both flanges 42 or 44 and, thereby, seats the sealing material 16 in the joint 23. By selectively directing that compressive load, the directing mechanism 60 substantially precludes both the occurrence of load losses in, and the application of reactive loads adjacent and opposite to, the compressive loading necessary to properly seat the sealing material 16. In so operating, the backing member 58 and associated directing mechanism 60 of one pipe section 12 or 14 preferably cooperate with another backing member 58 and directing mechanism 60 of the other pipe section 14 or 12, it being recognized that such cooperation may be absent without departing from the principles of the invention.

Figure 2:
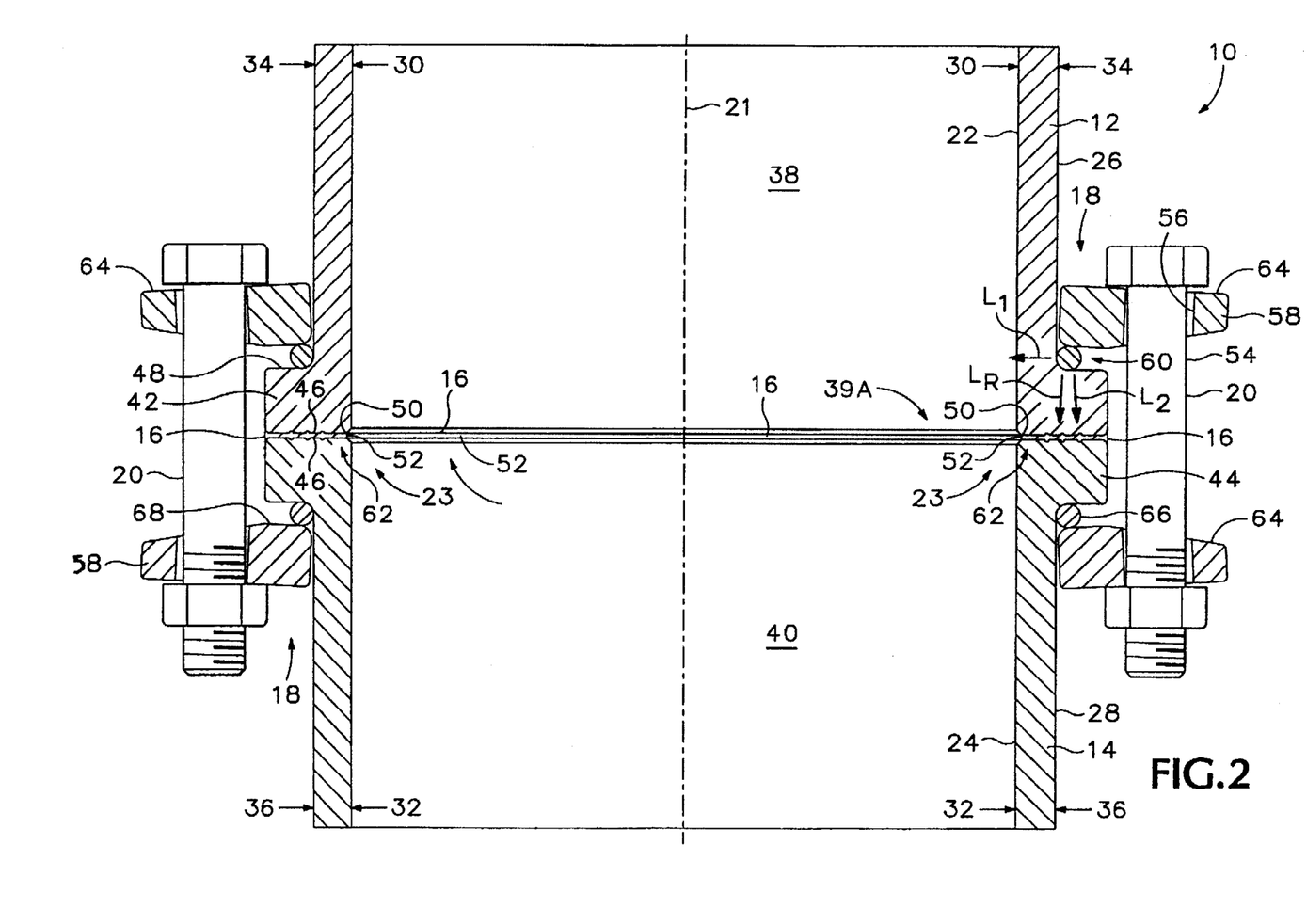
FIG. 2 is a cross-sectional view of a preferred embodiment of a joint assembly employing a backing mechanism according to the present invention.

Referring to FIG. 2, a preferred embodiment of the joint assembly 10 according to the present invention includes a backing member 58 in the form of a backing ring 64, and a directing mechanism 60 in the form of a collar 66 having a rounded cross-section, the collar 66 being disposed between the backing ring 64 and the load surface 48 of a respective flange 42 or 44. Although the collar's cross-section, as shown, is substantially circular, it is to be recognized that other cross-sectional shapes may be used without departing from the principles of the invention, provided they operate to direct the compressive load as described herein. The backing ring 64 has a substantially planar surface 68, along which it engages the collar 66. Preferably the planar surface 68 at its extremities is rounded so as to prolong the useful life of the backing mechanism 18 and, thence, the joint assembly 10. It is to be recognized, however, that the backing ring 64 may have other than rounded extremities without departing from the principles of the invention. It is also to be recognized that the collar 66 may be integral with a flange 42 or 44, for instance being formed by a convex load surface 48 of selected curvature or curvatures. Where the joint assembly's flanges 42 and 44 and pipe sections 12 and 14 are annular, it is preferred that the backing ring 64 and collar 66 are annular; however, other forms may be used without departing from the principles of the invention.

In operation, when a compressive load is applied to the backing ring 64, the load is transmitted through the radius of the collar 66 from where the backing ring 64 makes contact with the collar 66 to the load surface 48. With increasing compressive load, the backing ring 64 tends to be drawn toward the joint 23 causing the backing ring 64 to move on the collar 66, generally away from the central axis 21 of the joint assembly 10. That movement causes the collar 66 to direct the compressive load at an angle to the central axis 21 so that the load, a vector $L_R$, has a component $L_1$ that is substantially perpendicular to the central axis 21 and a component $L_2$ that is substantially parallel to the central axis 21.

Figure 3:
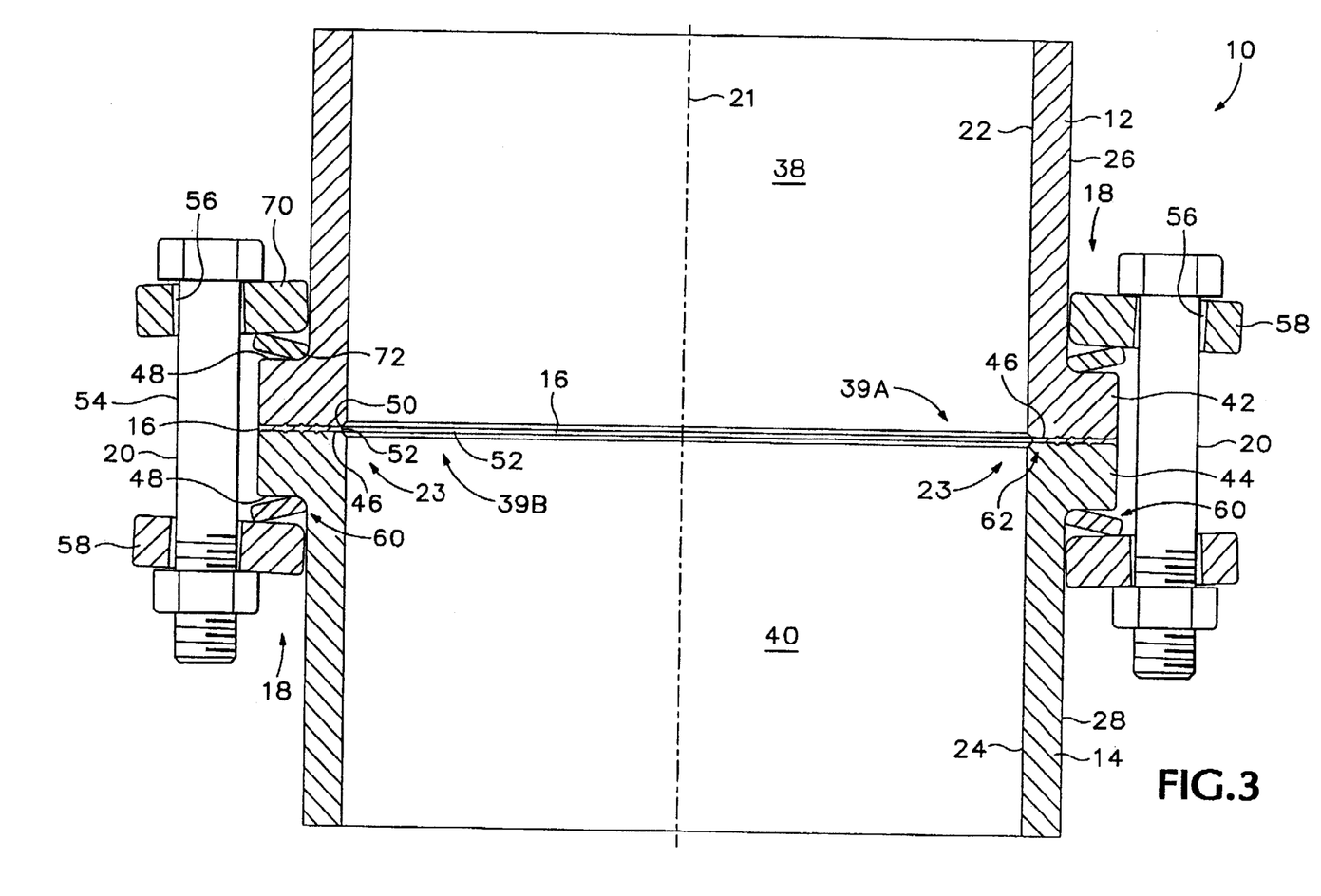
FIG. 3 is a cross-sectional view of another preferred embodiment of a joint assembly employing a backing mechanism according to the present invention.

Referring to FIG. 3, another preferred embodiment of the joint assembly 10 according to the present invention includes a backing member 58 in the form of a backing ring 70, and a directing mechanism 60 in the form of a beveled washer 72, the washer 72 being disposed between the backing ring 70 and the load surface 48 of a flange 42 or 44. The backing ring 70 is substantially similar to the backing ring 64 described above, except ring 70 is absent an angled surface provided for ease of access to the joint 23. The beveled washer 72 again operates by providing a resultant load $L_R$ having a component that is substantially perpendicular to the central axis 21 of the joint assembly 10.

Preferably the beveled washer is a spring washer, such as a BELLEVILLE washer.

Figure 4:
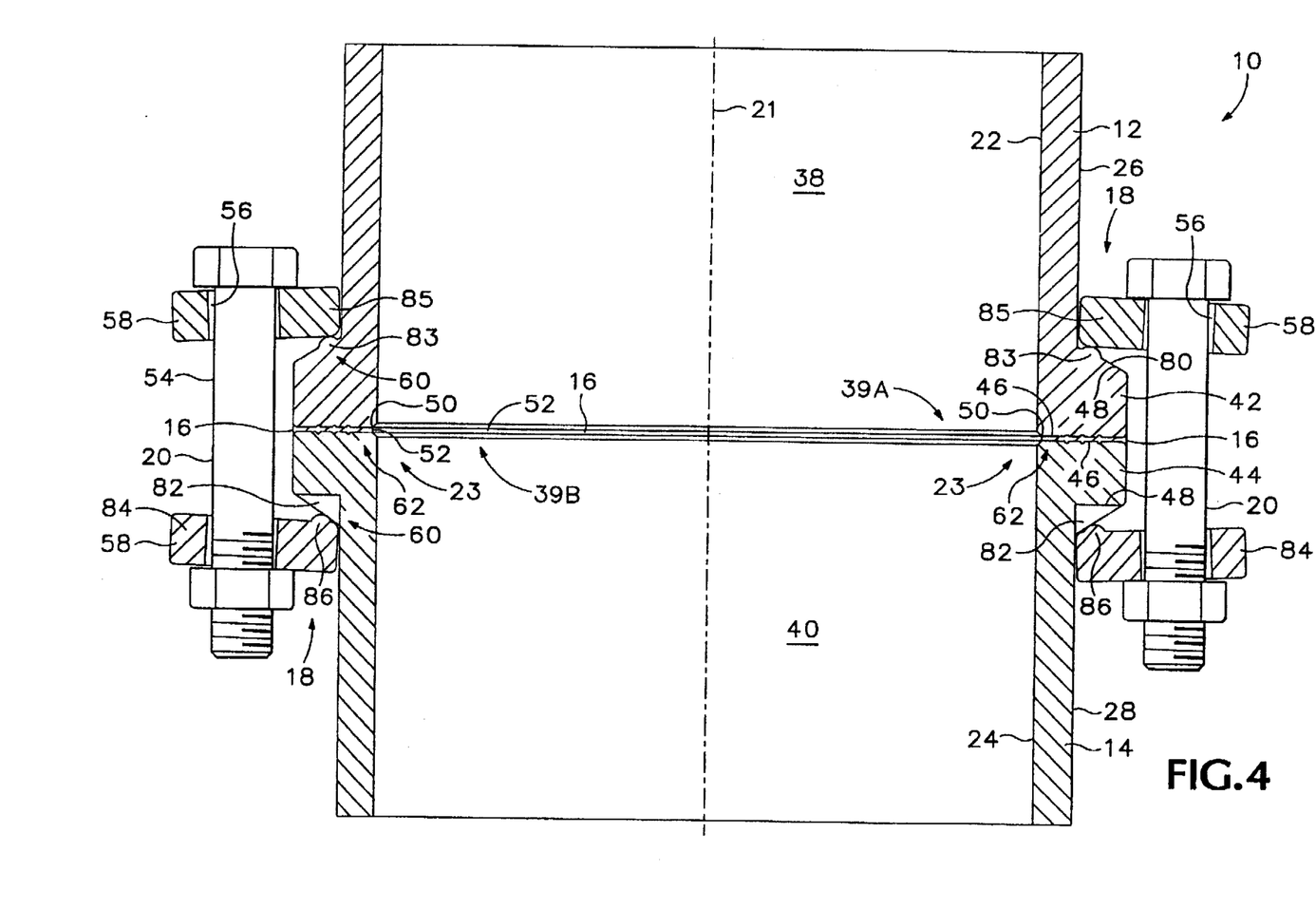
FIG. 4 is a cross-sectional view of another preferred embodiment of a joint assembly employing a backing mechanism according to the present invention.
Figure 5:
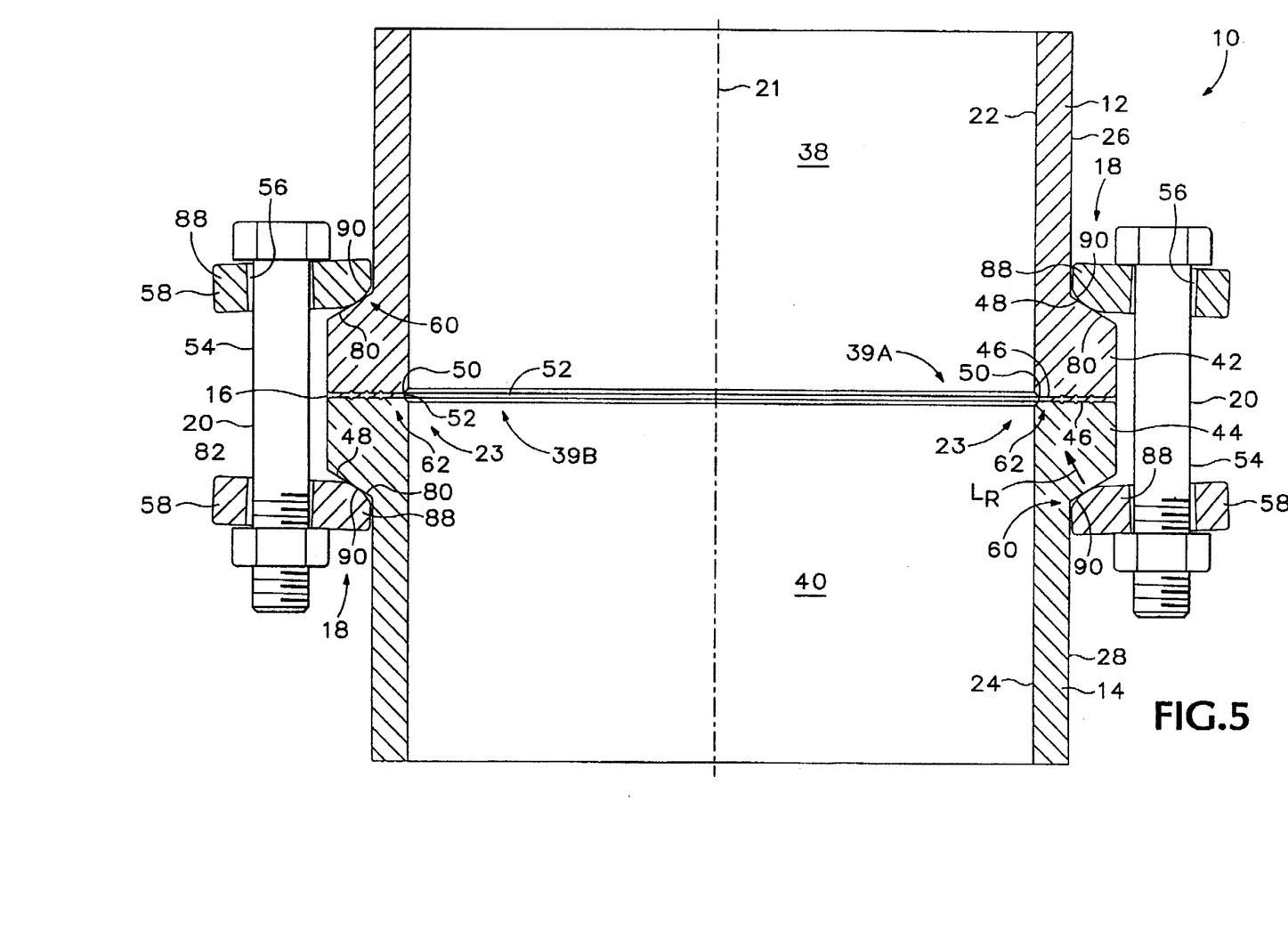
FIG. 5 is a cross-sectional view of another preferred embodiment of a joint assembly employing a backing mechanism according to the present invention.

Referring to FIGS. 4 and 5, additional preferred embodiments of the joint assembly 10 according to the present invention include a directing mechanism 60 in the form of a canted surface 80, the canted surface being disposed at a selected angle relative to the central axis 21 of the joint assembly 10. The canted surface 80 preferably is formed by the load surface 48 of a flange 42 or 44, or by a collar 82 having an appropriate cross-section, for example, a substantially triangular cross-section. If the collar 82 is employed, it is preferably disposed between the backing member 58 and the load surface 48 of a flange 42 or 44. The backing member 58 used in conjunction with a directing mechanism 60 formed by a canted surface 80 preferably comprises either, as shown in FIG. 4, a backing ring 84 having a rounded bead 86 or, as shown in FIG. 5, a backing ring 88 having a rounded surface 90. Backing rings 84 and 88 engage the canted surface 80 along the bead 86 and the rounded surface 90, respectively. As described with respect to FIG. 2, rounded surfaces are preferred in order to prolong the useful life of the backing mechanism 18 and, thence, the joint assembly 10.

In operation, the backing rings 84 and 88 engage the canted surface 80 so that a resultant load $L_R$ is applied to the backing rings 84 and 88, the load having a component that is substantially perpendicular to the central axis 21 of the joint assembly 10. The resultant load $L_R$ preferably is directed toward the joint 23 at an angle substantially perpendicular to the canted surface 80 where the load is applied.

Referring further to FIG. 4, in another preferred embodiment of the joint assembly 10, the canted surface 80 has a rounded bead 83 disposed thereon. In that embodiment, the backing member 58 preferably comprises a backing ring 85 having a substantially planar surface along which the ring 85 engages the surface 80. The engagement preferably is confined to the surface of the bead 85 when the load is applied to the ring 85.

Figure 6:
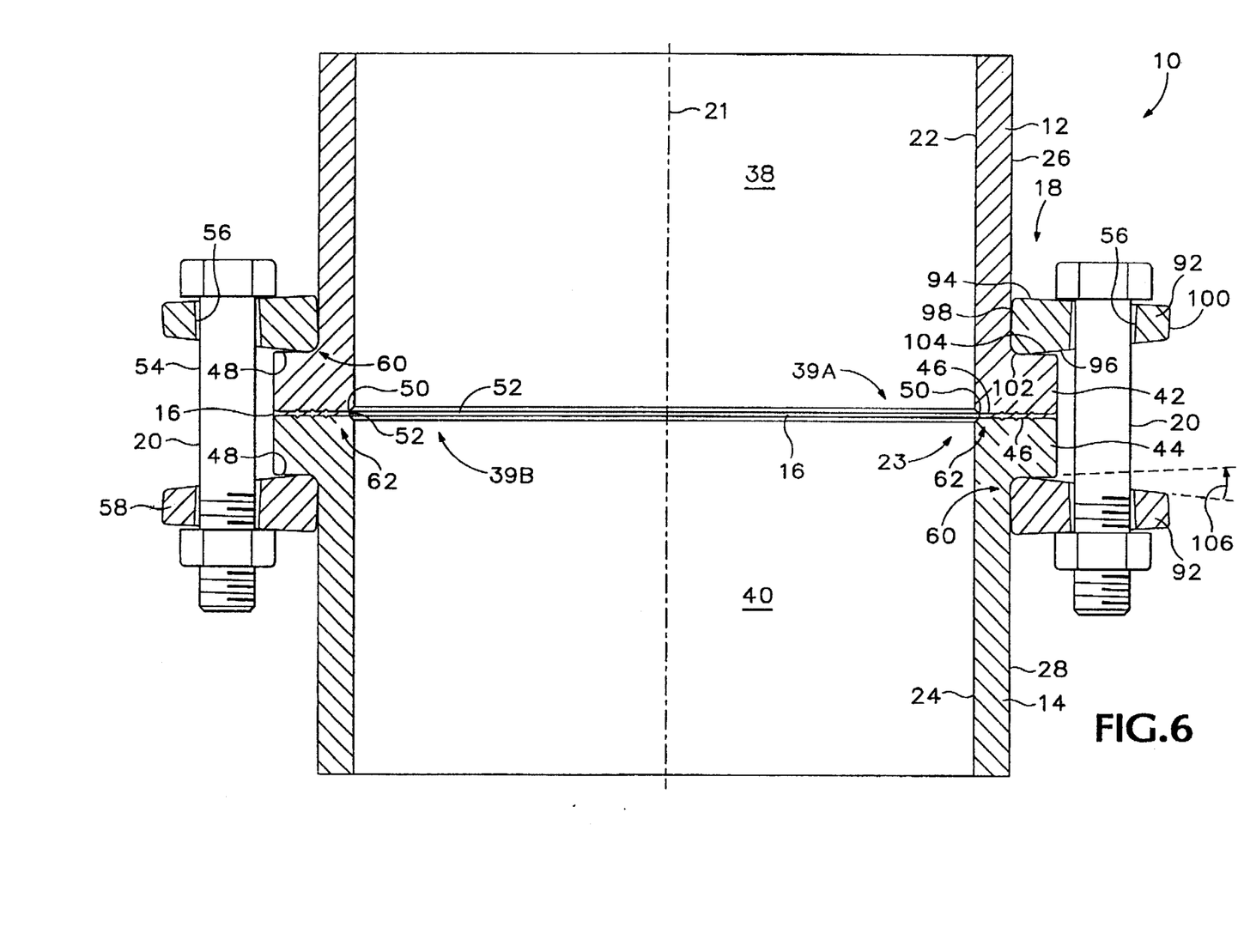
FIG. 6 is a cross-sectional view of another preferred embodiment of a joint assembly employing a backing mechanism according to the present invention.

Referring to FIG. 6, another preferred embodiment of the joint assembly 10 according to the present invention includes a backing member 58 in the form of a backing ring 92, the backing ring having a top face 94, a bottom face 96, an inside face 98 and an outside face 100. The backing ring 92 receives a compressive load from the fasteners 20 along the top face 94 and directs that load to the joint 23 from the bottom face 96. The bottom and inside faces 96 and 98 meet to form a radiused portion 102, the radiused portion 102 being disposed adjacent both the load surface 48 of a flange 42 or 44 and the outside surface 26 or 28 of a pipe section 12 or 14. The bottom face 96 has a beveled portion 104 extending from the radiused portion 102 toward the outside face 100 of the backing ring 92, the beveled portion 104 having a predetermined beveled angle 106 relative to the central axis 21 of the joint assembly. The beveled angle 106 generally varies from application to application, the angle 106 used in any particular application being a function of various factors, including the materials used in constructing the joint assembly 10, particularly the materials used for the backing mechanism 18. The beveled angle 106 provides that, when a compressive load of a predetermined optimum value is applied to the backing mechanism 18, the beveled portion 104 is drawn to within a predetermined clearance of the load surface 48 of a flange 42 or 44. Under such circumstances, the flange 42 or 44 is minimally deformed, if at all, and reactive loading adjacent the inside periphery 62 of the joint 23 is minimized or eliminated, thereby optimizing the application of the compressive load to the joint 23.

It is to be recognized that the principles set forth herein with respect to a joint formed by two pipe sections 10 and 12 apply equally to joints formed using a single pipe section 12 or 14. In particular, the principles apply to connect a ranged pipe to a blind flange, i.e., a flange for closing off the end of a pipe section, and to a nozzle, i.e., a flanged outlet from a tank or other container, the term "flange" used herein being intended to comprehend blind flanges, nozzle flanges, flanges disposed at the end of pipe sections, as well as other applications.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A pipe joint assembly, comprising:
   a pipe having an elongate axis, an outer surface and a flange disposed at one end of said pipe, said flange having a joint surface facing away from said pipe, an outer periphery, an inner periphery defining an outlet of said pipe, and a load surface disposed between said outer surface of said pipe and said outer periphery of said flange;
   sealing material disposed adjacent said joint surface of said flange and said inner periphery of said flange; and
   a backing member having a front face with a contact portion for engaging said load surface of said flange at a point of contact spaced inwardly from said outer periphery of said flange and outwardly from said inner periphery of said flange, and a load-receiving portion projecting outwardly from said contact portion for receiving a fastening load at a position spaced outwardly from said contact portion, said sealing material also being disposed beneath said point of contact, said front face of said load-receiving portion being spaced axially away from said load surface of said flange between said contact portion and said outer periphery of said flange so as to apply said fastening load to said load surface at said point of contact, and said contact portion, load surface of said flange and load receiving portion being so constructed and arranged for permitting rotation of said backing member at said point of contact when said fastening load is applied, thereby directing said fastening load toward said inner periphery of said flange.

2. The pipe joint of claim 1, wherein said backing member has an inner periphery and said contact portion comprises a portion of said backing member disposed substantially adjacent to said inner periphery of said backing member in contact with said load surface.

3. The pipe joint of claim 2, wherein said contact portion is rounded.

4. The joint assembly of claim 1, wherein said backing member further comprises a back face, an inner periphery adjacent said outer surface of said pipe and an outer periphery, said backing member receiving said load at said back face thereof and concentrating said load toward said front face thereof, said front face having a beveled portion extending from said inner periphery of said backing member toward said outer periphery of said backing member, said beveled portion having a bevel angle such that said load obtains an optimum value in the joint when said beveled portion is drawn to within a predetermined clearance of said load surface of said flange.

5. The pipe joint of claim 1, wherein said backing member has an inner periphery and said contact portion comprises a bead disposed substantially adjacent to said inner periphery of said backing member in contact with said load surface.

6. The pipe joint of claim 5, wherein said bead has an outer surface substantially in the shape of an arc of a circle.

7. The pipe joint of claim 1, wherein said backing member comprises a backing ring having a front face and an inner periphery and a directing member disposed between said front face of said backing ring adjacent said inner periphery thereof and said said load surface of said flange, said contact portion being part of said directing member.

8. The pipe joint of claim 7, wherein said directing member has a substantially circular cross section and said backing ring includes a substantially planar surface for engaging said directing member.

9. The joint assembly of claim 7, wherein said directing member comprises a beveled washer disposed between said backing member and the load surface of the flange.

10. The joint assembly of claim 1, further comprising a collar disposed on said load surface of said flange and having a canted surface disposed at a selected angle relative to the elongate axis of the pipe, said point of contact lying on said canted surface.

11. The pipe joint of claim 1, wherein said load surface includes a canted surface, said point of contact lying on said canted surface.

12. The pipe joint of claim 1, further comprising a backing ring disposed against said load-receiving portion of said backing member on a side thereof opposite said flange for applying force to said backing member.

13. The pipe joint of claim 12, wherein said backing ring includes a plurality of apertures spaced outwardly from said backing member, and said pipe joint further comprises a plurality of threaded fasteners disposed through said apertures for applying said fastening force.

14. The pipe joint of claim 1, wherein said load receiving portion of said backing member includes a plurality of apertures spaced outwardly from said contact portion, and said pipe joint further comprises a plurality of threaded fasteners disposed through said apertures for applying said fastening force.

15. A sealing assembly for a pipe joint wherein a pipe of the joint has an elongate axis, an outer surface of predetermined diameter and a flange disposed at one end of said pipe, said flange having a joint surface facing away from said pipe, an outer periphery of predetermined diameter, an inner periphery of predetermined diameter defining an outlet of said pipe, and a load surface disposed between said outer surface of said pipe and said outer periphery of said flange, said sealing assembly, comprising:

sealing material for placement against said joint surface of the flange adjacent the inner periphery of the flange, said sealing material having a predetermined inner diameter substantially equal to the inner diameter of the predetermined inner periphery of the flange; and a backing member having a front face with a contact portion of predetermined nominal diameter for engaging the load surface of the flange at a point of contact spaced inwardly from the outer periphery of the flange and outwardly from the inner periphery of the flange, and a load-receiving portion projecting outwardly from said contact portion for receiving a fastening load at a position spaced outwardly from said contact portion, said sealing material having a portion thereof with a predetermined nominal diameter substantially equal to said nominal diameter of said contact portion of said backing member so as to lie thereunder in a pipe joint, said front face of said load-receiving portion being spaced axially away from the load surface of the flange between said contact portion and the outer periphery of the flange so as to apply said fastening load to the load surface at said point of contact, and said contact portion, load surface of said flange and load receiving portion being so constructed and arranged for permitting rotation of said backing member at said point of contact, thereby directing said fastening load toward said inner periphery of said flange.

16. The sealing assembly of claim 15, wherein said backing member has an inner periphery and said contact portion comprises a portion of said backing member disposed substantially adjacent to said inner periphery thereof in contact with said load surface.

17. The sealing assembly of claim 16, wherein said contact portion is rounded.

18. The sealing assembly of claim 15, wherein said backing member further comprises a back face, an inner periphery and an outer periphery, said front face having a beveled portion extending from said inner periphery of said backing member toward said outer periphery of said backing member.

19. The sealing assembly of claim 15, wherein said backing member has an inner periphery and said contact portion comprises a bead disposed at said inner periphery of said backing member in contact with said load surface.

20. The sealing assembly of claim 19, wherein said bead has an outer surface substantially in the shape of an arc of a circle.

21. The sealing assembly of claim 15, wherein said backing member comprises a backing ring having a front face and an inner periphery and a directing member for placement between said front face of said backing ring adjacent said inner periphery of said load-receiving portion and said load surface of the flange, said contact portion being part of said directing member.

22. The sealing assembly of claim 21, wherein said directing member has a substantially circular cross section and said backing ring has a substantially planar surface for engaging said directing member.

23. The sealing assembly of claim 15, further comprising a backing ring for placement against said load-receiving portion of said backing member on a side thereof opposite the flange for applying a load to said backing member.

24. The sealing assembly of claim 23, wherein said backing ring includes a plurality as apertures located at positions spaced outwardly from said backing member for receiving respective threaded fastener.

25. The sealing assembly of claim 15, wherein said load receiving portion of said backing member includes a plurality of apertures located at positions spaced outwardly from said contact portion for receiving respective threaded fasteners.

* * * * *

UNITED STATES PATENT AND TRADEMARK OFFICE
CERTIFICATE OF CORRECTION

PATENT NO. : 5,716,083
DATED : February 10, 1998
INVENTOR(S) : Ronald L. Carr

It is certified that error appears in the above-indentified patent and that said Letters Patent is hereby corrected as shown below:

On the title page item [57],

Line 11 of the Abstract, change "from" to --front--

Column 4, line 47, change "side" to --inside--, "28" to --24-- and "24" to --28--.

Column 4, line 56, change "24" to --22-- and "26" to --24--.

Column 7, line 37, change "85" to --83--.

Column 8, line 2, change "10" to --12--.

Column 8, line 3, change "12" to --14--.

Column 8, line 5, change "ranged" to --flanged--.

Column 9, line 11, change "said said" to --said--.

Signed and Sealed this

Eighteenth Day of August, 1998

Attest:

BRUCE LEHMAN

*Attesting Officer*     *Commissioner of Patents and Trademarks*